April 14, 1942.  A. N. PORTER  2,279,719
BEARING
Filed April 24, 1939   3 Sheets-Sheet 1

INVENTOR
Albert N. Porter
BY
Arthur C. Brown
ATTORNEY

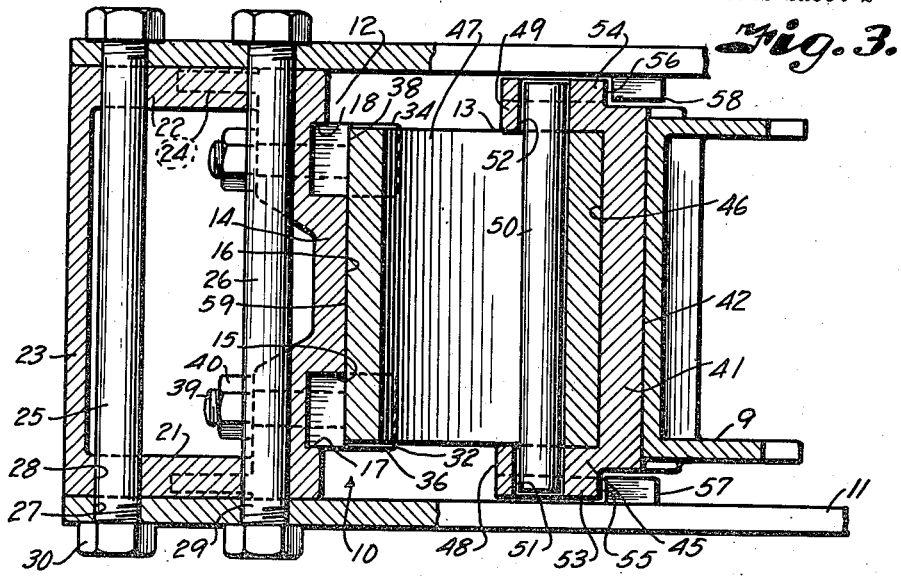
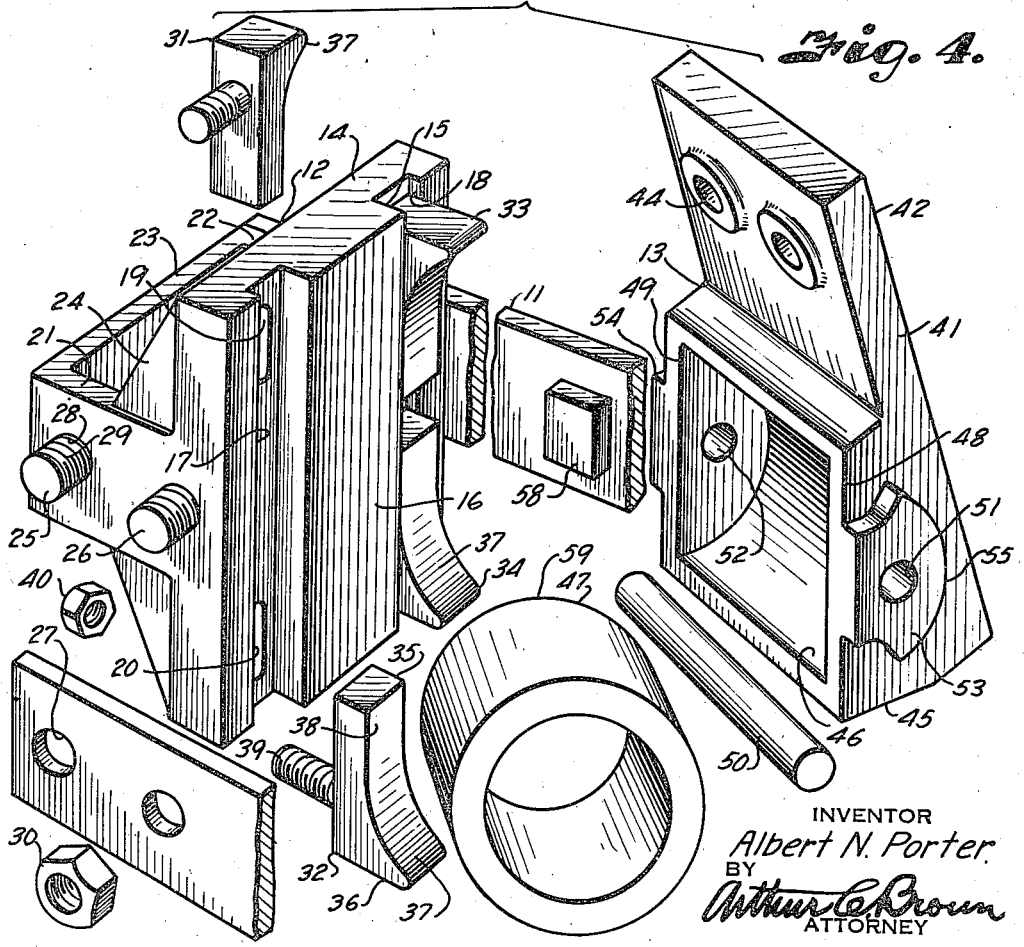

April 14, 1942.  A. N. PORTER  2,279,719
BEARING
Filed April 24, 1939  3 Sheets-Sheet 3
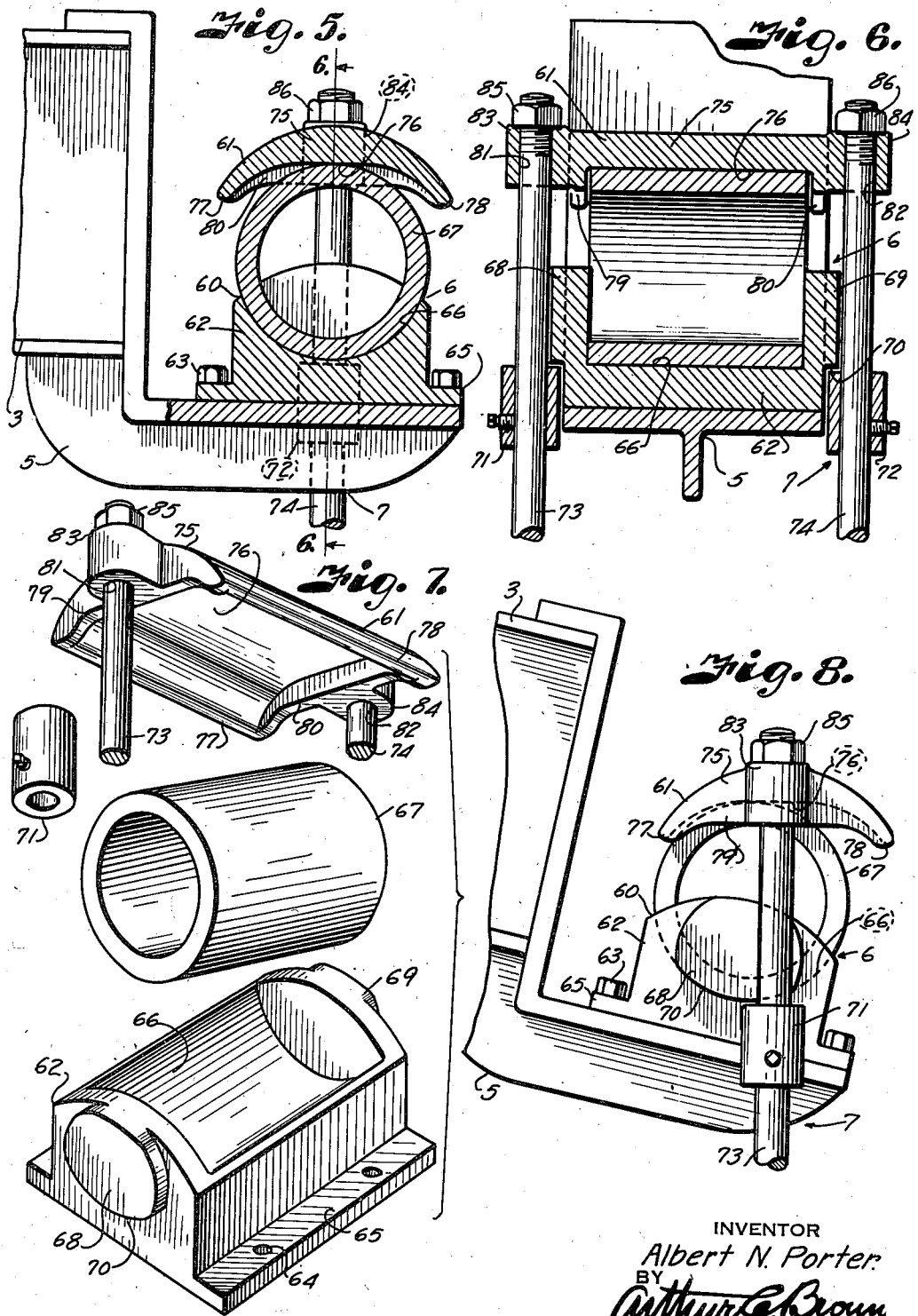
INVENTOR
Albert N. Porter.
BY Arthur E. Brown
ATTORNEY Patented Apr. 14, 1942

2,279,719

UNITED STATES PATENT OFFICE 2,279,719

BEARING

Albert N. Porter, Tulsa, Okla.

Application April 24, 1939, Serial No. 269,602

10 Claims. (Cl. 308—21)

This invention relates to bearings, particularly those for interconnecting a reciprocating member with an oscillating member, and has for its principal object to provide a bearing of this character which is of simple and inexpensive construction and free from slippage or sliding of the bearing surfaces with respect to each other so that no lubricant is required.

Other objects of the invention are to provide a bearing having cooperating members one fixed to the reciprocating member and the other to the oscillating member with the bearing member on the reciprocator having a flat contact surface engaged by an arcuate surface of the bearing member on the oscillator; to provide the bearing member on the oscillator with stops for retaining alignment of the respective bearing members when in idle position; to provide for adjustment of the stops in accordance with stroke of the oscillating member; and to provide for presenting new contact portions of the bearing member carried by the oscillating element.

A further object of the invention is to provide a bearing having the parts arranged to prevent lodgment of sand and similar abrasive foreign material.

In accomplishing these and other objects of the invention, as hereinafter pointed out, I have provided improved details of structure, the preferred forms of which are illustrated in the accompanying drawings, wherein:

Fig. 3 is a horizontal section on the line 3—3 of Fig. 2.

Fig. 4 is a detail perspective view of the parts of the bearing shown in disassembled spaced relation.

Fig. 5 is a vertical section through the beam hanger bearing.

Fig. 6 is a section on the line 6—6 of Fig. 5.

Fig. 7 is a perspective view of the parts of the beam hanger bearing shown in disassembled spaced relation.

Fig. 8 is a perspective view showing position of the bearing members at the end of the stroke of the beam.

Figure 1:
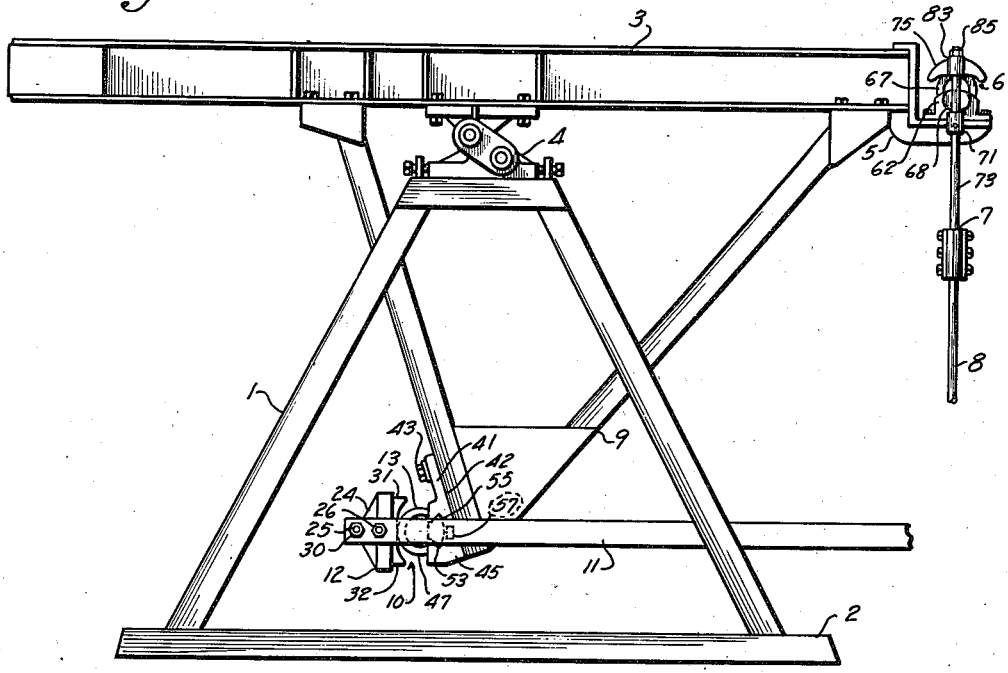
Fig. 1 is a side elevational view of a pumping jack equipped with beam hanger and pull rod bearings embodying the features of the present invention.
Figure 2:
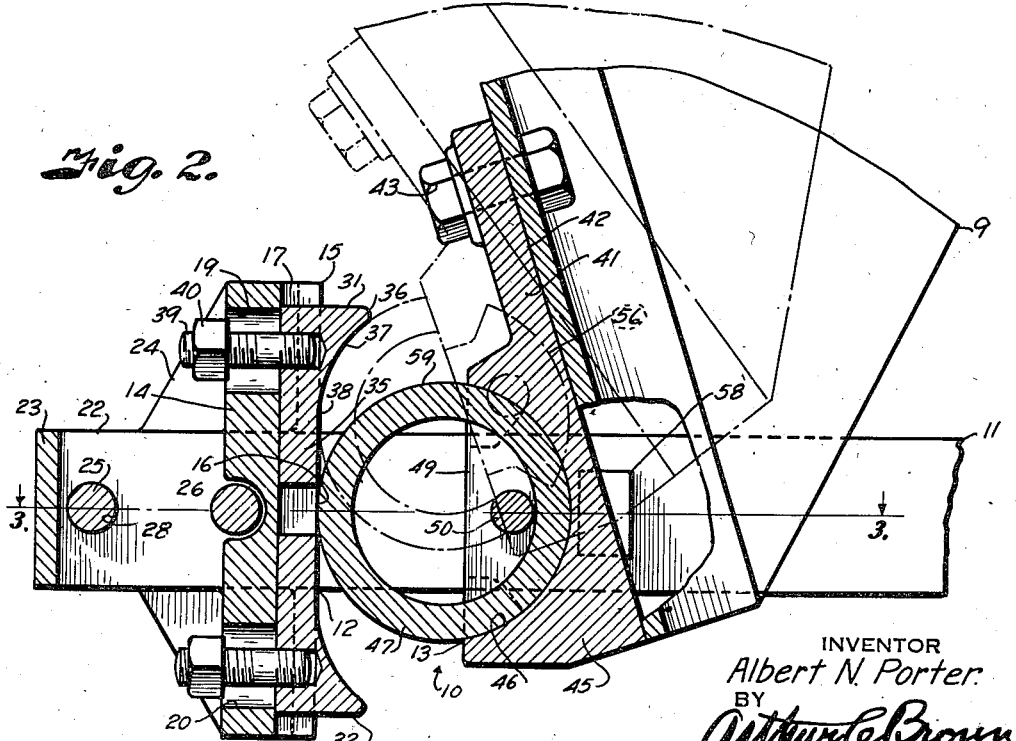
Fig. 2 is an enlarged sectional view through the pull rod bearing.

Referring more in detail to the drawings:

My improved bearing is particularly adapted for use on machines and operating parts which are subjected to heavy loads and adverse working conditions. I have, therefore, illustrated the bearings as adapted to a pumping jack which operates under tremendous loads and is subject to adverse conditions through operation during sand and dust storms which make oil type bearings impracticable.

The pumping jack illustrated includes a tower-like Samson-post structure 1 supported on a base frame 2 and mounting a walking beam 3. The walking beam 3 is oscillatably carried on a Samson-post by a saddle-type bearing 4 and has the forward end provided with a step-like bracket 5 carrying a bearing 6 to which a beam hanger 7 is connected. When the jack is mounted at a well the beam hanger 7 is connected with the polish rod 8. Depending from the beam is a substantially triangular shaped frame 9 connected by the bearing 10 with pull rod reins 11, the reins 11 being connected to a pull rod (not shown) for effecting operation of the jack.

In operation the pull rod and reins 11 are reciprocated to effect oscillation of the beam on the saddle bearing 4 and reciprocation of the polish rod. The reins 11 and beam hanger 7 may therefore be referred to as reciprocatory members and the frame 9 and beam 3 as oscillatory members.

The jack structure specifically forms no part of the present invention but is illustrated and described to give a better understanding and explanation of the bearings 6 and 10 which constitute the present invention. The bearing 10 includes cooperating bearing members 12 and 13 with the bearing member 12 connected with the pull reins or reciprocating member and the bearing member 13 with the oscillatory member. The bearing members 12 and 13 are best illustrated in Fig. 4. The bearing member 12 includes a plate-like body 14 having a raised, central portion 15 extending vertically thereof to form a flat, elongated bearing surface 16. Formed in the plate at the opposite sides of the bearing surface 16 are channel-shaped grooves 17 and 18, the bottoms of which are provided with slots 19 and 20 to adjustably mount stops later described. Projecting rearward relatively to the surface 16 at the respective sides of the plate-like body are arms 21 and 22 interconnected at their outer ends by a bar 23. The ends of the plate portion are braced with respect to the arms by suitable webs 24. The outer sides of the arms 21 and 22 are substantially flat to seat the ends of the pull rod reins 11 which are retained thereagainst by rods 25 and 26 extending through registering openings 27 and 28 in the reins and arms respectively as shown in Fig. 3, the ends of the rods being threaded as at 29 and provided with nuts 30 which are drawn tight against the reins.

Adjustably mounted in the channel-like grooves are pairs of stops 31—32 and 33—34 each including a bar portion 35 snugly slidable in the respective grooves and spaced stop portions 36 projecting beyond the plane of the contact surface 16 and having arcuate stop faces 37 terminating in flat faces 38 registering with the contact surfaces 16 to extend the contact surface relatively to the width of the bearing member. The opposite faces of the stops have threaded studs 39 extended through the respective slots 19 and 20 and provided with nuts 40 by which the stops are firmly anchored in adjusted position.

The bearing member 13 includes a plate-like body 41 having a flat face 42 adapted to seat against the lower end of the triangular shaped frame 9 and which is retained by fastening devices, such as bolts 43, extending through openings 44 at the upper portion of the plate-like body and through registering openings in the frame 9. Formed on the lower end of the plate-like body is a substantially rectangular extension 45 having an arcuate recess 46 to snugly seat a cylindrical contact member 47. The contact member 47 is of a width substantially corresponding to the width of the contact surfaces of the bearing member 12 and the ends thereof snugly fit within the end walls 48 and 49 of the recess 46. The contact member is preferably of sleeve-like character and has passed therethrough a retaining rod or pin 50 having its ends engaged in openings 51 and 52 of the walls 48 and 49 as shown in Fig. 3. The outer side faces of the bearing member 13 have bosses or stops 53 and 54 provided with arcuate edges 55 and 56 adapted to contact restraining means including inwardly extending lugs 57 and 58 on the reins 11. The pin 50 fits loosely within the openings 51 and 52 and is retained from displacement by the pull rod reins which operate at the sides of the bearing member.

When the parts are assembled the cylindrical surface 59 of the contact member 47 is engaged with the flat surface 16 of the bearing member 12 so that when the reins are reciprocated through the pull rod to oscillate the beam, the contact surface 59 rocks upon the surface 16 between the respective stops, the stops being so adjusted in their mounting grooves that the contact member does not bear upon the arcuate faces of the stops under the stroke of the beam for which the rods have been adjusted. If the stroke of the rods is to be longer, the oscillatory movement of the beam will be correspondingly greater and consequently the cylindrical surface 59 will rock farther with respect to the contact surface 16 so that it is necessary to move the stops outwardly in their respective grooves. This is readily accomplished by loosening the retaining nuts 40 and tightening them after the adjustment has been effected. If the stroke is to be shortened, the stops will be moved correspondingly closer.

Under load conditions the contact surfaces of the respective bearing members will retain their correct rocking positions but when the operation of the jack is suspended and the load is relieved, the bearing member 12 will tend to slip with respect to the bearing member 13. However, this movement is limited by the stops so that when the load is again applied the bearing members will readily adjust themselves to their original operating position. The lugs 57 and 58 cooperate with the arcuate faces of the bosses 56 on the bearing member 13 so as to limit separation of the respective bearing members.

The bearing member 6 substantially follows the same construction and includes cooperating bearing members 60 and 61. The member 60 has a block-like body 62 secured to the step portion of the bracket 5 by fastening devices, such as bolts 63, extending through openings 64 in lateral flanges 65. The block-like body has an arcuate recess 66 for receiving the contact member 67 corresponding with the contact member 47 previously described, the bearing member being arranged so that the axis of the cylindrical contact member extends transversely across the width of the beam as shown in Figs. 5 and 6. The ends of the body portion have bosses 68 and 69 provided with arcuate lower faces 70 which are adapted to be engaged by adjustable collars 71 and 72 on the side rods 73 and 74 of the beam hanger as clearly shown in Fig. 6.

The bearing member 61 includes a plate-like body 75 having a flat inner contact face 76 engageable with the cylindrical contact face of the member 67 as shown in Fig. 5. The side edges of the member 61 curve downwardly, as at 77 and 78, to form the limit stops and the ends are provided with depending flanges 79 and 80 which cooperate with the side edges to protect the cylindrical contact member and prevent dust, dirt and other abrasive foreign material from lodging between the contacting faces. The rods 73 and 74 of the beam hangers project through openings 81 and 82 in ears 83 and 84 projecting from the ends of the bearing member 61 as clearly shown in Fig. 7, the rods being retained by nuts 85 and 86 that are threaded thereon.

Bearings of the type described have rocking contact between the flat surface carried by the reciprocating member and the arcuate surface carried by the oscillatory member so that no lubricant is required and no slippage occurs between the respective contact surfaces.

It is further obvious that the bearings are of simple, inexpensive construction, requiring the minimum of machining operations and are well adapted for operation under heavy loads and under adverse conditions such as encountered in oil field operations.

What I claim and desire to secure by Letters Patent is:

1. A bearing for connecting a reciprocating member with an oscillating member including, a bearing member adapted to be fixed to the reciprocating member and having a plane-like contact face extending in a plane transversely to the direction of reciprocation, a cooperating bearing member adapted to be fixed to the oscillating member and having a socket, and a cylindrical member in said socket having a cylindrical contact surface engaging the plane-like contact surface of the other bearing member.

2. A bearing for connecting a reciprocating member with an oscillating member including, a bearing member adapted to be fixed to the reciprocating member and having a plane-like contact surface extending in a plane transversely to the direction of reciprocation, a cooperating bearing member adapted to be fixed to the oscillating member and having a socket, a cylindrical member in said socket having a cylindrical contact surface engaging the plane-like contact surface of the other bearing member, and means for movably retaining said cylindrical member in the socket to present new contact surfaces to the plane-like contact surface.

3. A bearing for connecting a reciprocating member with an oscillating member including, a bearing member adapted to be fixed to the reciprocating member and having a plane-like contact surface extending in a plane transversely to the direction of reciprocation, a cooperating bearing member adapted to be fixed to the oscillating member and having a socket, a sleeve member in said socket and having a cylindrical contact surface engaging the plane contact surface of the other bearing member, and a pin extending through said sleeve member for movably retaining said sleeve member in the socket.

4. A bearing for connecting the pull rod reins with the oscillating arm of a walking beam comprising a bearing member for connectingly spacing said reins and having a flat contact face extending transversely with respect to the path of travel of the reins, limit stops at opposite sides of said flat contact face, a cooperative bearing member for connection with said oscillating arm, arcuate means on said cooperative bearing member forming a rocking surface whereon the contact face of the other bearing member rocks as limited by said limit stops, stops for projection inwardly from said reins, and cooperating means on the bearing member having said arcuate means adapted to engage said last named stops for retaining engagement of said contact faces.

5. A bearing for connecting the pull rod reins with the oscillating arm of a walking beam comprising a bearing member for connectingly spacing said reins and having a flat contact face free of any projections and extending transversely with respect to the direction of travel of the reins, a cooperative bearing member for attachment on said oscillating arm and having a socket, a cylindrical member supported in said socket and having a similarly smooth arcuate contact face engaging the plane contact face of the other member, stops projecting inwardly from said reins, and cooperating means on the last named bearing member adapted to engage said stops for retaining engagement of said contact faces.

6. A bearing for connecting the pull rod reins with the oscillating arm of a walking beam comprising a bearing member for connectingly spacing said reins and having a flat contact face free of any projections and extending transversely with respect to the direction of travel of the reins, a cooperative bearing member adapted for attachment on said oscillating arm and having a socket, a cylindrical member supported in said socket and having a similarly smooth arcuate contact face engaging the flat contact face of the other member, stops adapted to project inwardly from said reins, cooperating means on the last named bearing member adapted to engage said stops for retaining engagement of said contact faces, and stops carried by the first named bearing member for limiting movement of one bearing member with respect to the other.

7. A bearing for connecting the pull rod reins with the oscillating arm of a walking beam comprising a bearing member for connectingly spacing said reins and having a plane contact face extending transversely with respect to the direction of travel of the reins, a cooperative bearing member for mounting on said oscillating arm and having a socket, a sleeve supported in said socket and having an arcuate contact face engaging the plane contact face of the other member, stops adapted to project inwardly from said reins, cooperating means on the last named bearing member adapted to engage said stops for retaining engagement of said contact faces, stops carried by the first named bearing member for limiting movement of one bearing member with respect to the other, and means adjustably mounting said stops on said first named bearing member.

8. A bearing of the character described including a member having a flat contact face and provided with a guide groove extending across said flat contact face, stops selectively positionable in the respective ends of said guide groove, means anchoring the stops in selected position in said groove, a cooperating bearing member having a rocker surface in face to face contact with said flat contact face and limited by said stops, and means inter-connecting said bearing members for maintaining said face to face contact.

9. A bearing for connecting a reciprocating member with an oscillating member including, a bearing member adapted to be fixed to the reciprocating member and having a smooth plane-like contact face free of any projections and extending in a plane transversely to the direction of reciprocation, limit stops at opposite sides of the plane-like contact face, a cooperating bearing member adapted to be fixed to the oscillating member and having a similarly smooth arcuate contact face rockable in face to face contact with the plane-like face of the other bearing member a distance limited by said stops, and interengaging means connected with the respective bearing members for keeping said rocking bearing member in rocking contact with the smooth plane-like contact face of the first named bearing member while rocking between said limit stops.

10. A bearing for connecting a reciprocating member with an oscillating member including, a bearing member adapted to be fixed to the reciprocating member and having a flat contact surface free of any projections and extending in a plane transversely to the direction of reciprocation, a cooperating bearing member adapted to be fixed to the oscillating member and having a similarly smooth arcuate contact face with the axis thereof extending parallel with said plane and having face to face rocking contact with said flate surface, eave-like projections at opposite ends of the flat contact surface of the bearing member that is fixed to the reciprocating member for protecting the contact surfaces of said bearing members and forming limit stops for limiting rocking movement of said arcuate contact face on said flat contact surface, and interengaging means connected with the respective bearing members for keeping said rocking bearing member in rocking contact with the smooth plane-like contact face of the first named bearing member while rocking between said limit stops.

ALBERT N. PORTER.